United States Patent [19]

Vanaschen et al.

[11] Patent Number: 5,125,948
[45] Date of Patent: Jun. 30, 1992

[54] HEAT CONDITIONING CHAMBER

[75] Inventors: Luc Vanaschen, Eupen, Belgium; Hans W. Kuster, Allemagne Federale, Fed. Rep. of Germany; Benoit D'Iribarne, Grande-Bretagne, Great Britain; Achim Thau, Allemagne Federale, Fed. Rep. of Germany

[73] Assignee: Saint-Gobain Vitrage International, Courbevoie, France

[21] Appl. No.: 542,595

[22] Filed: Jun. 25, 1990

[30] Foreign Application Priority Data

Jun. 23, 1989 [DE] Fed. Rep. of Germany ....... 3920573

[51] Int. Cl.$^5$ ............................................. C03B 25/08
[52] U.S. Cl. ....................................... 65/348; 65/162; 65/351
[58] Field of Search ................. 65/114, 118, 119, 162, 65/268, 348, 351

[56] References Cited

U.S. PATENT DOCUMENTS

| 1,955,163 | 4/1934 | Adams | 65/119 |
| 2,822,645 | 2/1958 | Weller et al. | 65/351 |
| 3,311,463 | 3/1967 | Atkeson | 65/119 |
| 3,840,360 | 10/1974 | Wright et al. | 65/119 |

Primary Examiner—Joye L. Woodard
Attorney, Agent, or Firm—Oblon, Spivak, McClelland, Maier & Neustadt

[57] ABSTRACT

The invention relates to a heat conditioning chamber for controlled cooling following a high-temperature treatment of plane thin glass sheets, transported in horizontal position by a continuously driven roller conveyor. According to the invention, in the hottest zone in the chamber, the cooling is performed solely by absorption of radiation and continues in other zones by convection.

16 Claims, 3 Drawing Sheets

HEAT CONDITIONING CHAMBER

BACKGROUND OF THE INVENTION

1. Field of the Invention

The invention relates to a heat conditioning chamber for controlled cooling following a high-temperature treatment, of plane thin glass sheets, transported in horizontal position by a continuously driven roller conveyor. The invention also relates to chambers which comprise at least two separate independently adjustable cooling zones.

2. Description of the Related Art

When deformations and/or tensions in glass sheets should not occur following a high-temperature treatment, it is necessary to initiate a controlled, slow and regular cooling. This cooling or annealing is performed by convection in a heat conditioning chamber of the tunnel furnace type or not, in which an air current is blown and stirred, the air being blown by crosswise nozzles and sucked into the intake of the chamber in which it circulates in the direction opposite to the direction of transport of the glass sheets (DE--A-1 069 549 and DE-A-1 960 367).

It has been proven that the chambers known in the art do not give satisfactory results in the case of very thin glass sheets, of less than 3 mm of thickness, for example, at least if reference is made to the greatest requirements concerning the surface evenness and the absence of stresses. Such requirements are imposed, for example, for glass sheets intended to be joined by lamination and undergoing, before their forming, a high-temperature treatment. Such a treatment is necessary, for example, to apply current supply electrodes and/or to proceed to baking an enamel framing. Glass sheets thus prepared particularly enter into making heated windshields.

The usual processes do not lead, except in proceeding in an exceptional manner, to an optical quality similar to the optical quality currently obtained for traditional nonheated windshields, mainly because of the state of the glass sheets before their forming. Actually, not to exert a negative influence on the quality of the laminated glazing, each glass sheet should be not only absolutely plane and without deformations but also perfectly free of inner stresses able to generate troublesome deformations during the forming.

SUMMARY OF THE INVENTION

Accordingly, an object of this invention is to provide for a novel heat conditioning chamber suited to cooling thin glass sheets after a high-temperature treatment, the cooled glass sheets having to satisfy the extreme requirements imposed in matters of surface evenness and absences of stresses in glass sheets intended to be assembled by lamination.

The heat conditioning chamber according to the invention comprises a first cooling zone limited longitudinally by partitions leaving only narrow input/output slots for glass sheets, having, on each side of the conveyor, a radiation absorber extending over the entire width of the chamber, the temperature of these absorbers and the cooling air flow which pass through them being adjustable and a second cooling zone comprising, on one hand, slot nozzles placed on each side of the conveyor, placed perpendicular to the direction of transport and blowing cooling air regulated in temperature and, on the other hand, openings giving to the cooling air a component of axial speed, opposite to the direction of transport.

A heat conditioning chamber meeting the characteristics of the invention makes it possible to meet the greatest requirements in the case of cooling of thin glass sheets, even if the transport speed of the glass sheets is relatively high.

In a chamber according to the invention, in the most critical phase of the cooling, which corresponds to the highest glazing temperatures, the cooling is performed solely by absorption of radiation by absorption pipes or boxes of large surface having a surface temperature regulated in an optimal way.

To prevent any convection which would cause a disturbance of the cooling, the first cooling zone is designed as a closed chamber and comprises only two openings in slot form for the input and the output of the sheets, these slots being as narrow as the thickness of the glass sheets allow. In this first cooling zone, the glass sheet cools in a slow and regular manner, and its temperature is lowered to about 50° C., which is sufficient to remove it from the range of critical temperatures. To do this, the surface temperature of the radiation absorbers typically is regulated to a temperature of about 400° C. by using, if necessary, and particularly during the starting phase of the furnace, electric heating elements.

After this first cooling phase, the glass sheets enter the second cooling zone, in which a still regular but more intensive cooling is performed essentially by cooling air convection blown by the slot nozzles and circulating in the direction opposite to the direction of transport of the glass plates.

Accordingly, the present invention relates to a heat conditioning chamber for controlled cooling following a high-temperature treatment of plane thin glass sheets, comprising: a continuously driven roller conveyor for transporting the glass sheets in a horizontal position; and at least two independent cooling zones, the first cooling zone being longitudinally limited by partitions, the partitions defining narrow input/output slots for the glass sheets, the first cooling zone comprising, on each side of the conveyor, a radiation absorber, the radiation absorbers extending over the entire width of the chamber, the first cooling zone further comprising means for adjusting the temperature of the radiation absorbers and means for adjusting a cooling air flow which passes through the radiation absorbers; the second cooling zone comprising slot nozzles which are positioned on each side of the conveyor and positioned perpendicular to the direction of transport, the slot nozzles blowing cooling air which is regulated in temperature and comprising openings which provides the cooling air with a component of axial speed in a direction opposite the direction of transport.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
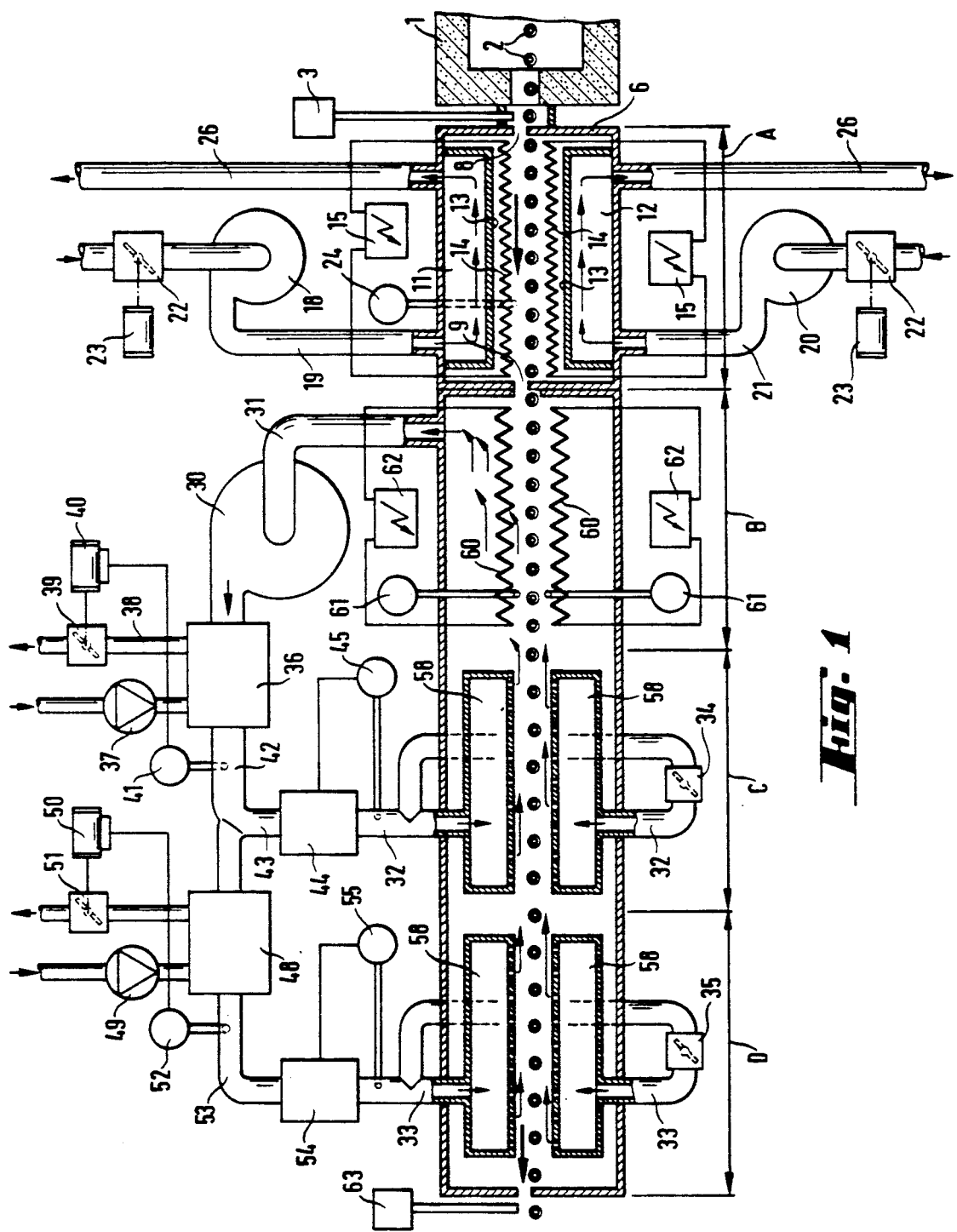
FIG. 1 shows a first embodiment of a heat conditioning chamber according to the invention.

The heat conditioning chamber is placed following a furnace 1 where, for example, the baking is performed of enamels deposited by silk-screening on a thin glass plate, typically of a thickness of 1.5 mm to 2.5 mm, plates intended for an assembly by lamination for a windshield being involved. Upon exiting the furnace 1, the temperature of the glass plates is on the order of 500°-600° C. The glass plates are transported to the heat conditioning chamber by conveyor 2 synchronized with the speed of furnace 1. A radiation pyrometer 3 measures the actual temperature of the glass plates at the time of their input, this temperature being used as reference for the various devices described below.

The heat conditioning chamber comprises two cooling zones, namely a first cooling zone A and a second cooling zone comprising three sections B, C and D.

Cooling zone A is closed on furnace 1 side by a partition 6 and relative to section B by a partition 7. These partitions 6 and 7 comprise narrow openings of the slot type allowing the input (slot 8) and output (slot 9) of the plates, the dimensions and the configuration of the slots being chosen so as to limit as much as possible the exchanges with the outside air. The other faces of the chamber also are closed in as airtight a manner as possible.

The cooling of glass plates is performed inside cooling zone A solely by absorption of the heat by radiation absorbers 11 and 12 respectively placed above and below conveyor 2. Radiation absorbers 11 and 12 consist of metal housings of large surface fed inside by air at a regulated temperature, so that plane cooling faces 13 located opposite the glass plates are regulated to a desired temperature. During the starting phase of the furnace, during which the rollers of conveyor 2 also are relatively cold, cooling zone A is heated by heating elements 14 placed between conveyor 2 and cooling faces 13 fed electric current by a voltage regulator 15 controlled by the control of the process.

Upper radiation absorber 11 is fed by blower 18 via pipe 19 and lower radiation absorber 12 by blower 20 via pipe 21. The flow of the cooling air is regulated to the necessary value by a reducing damper 22 displaced by an electric motor 23 controlled by the control device of the process. The quantity for regulation is the inside temperature of the chamber, measured between the surface of the glass and cooling face 13, by a temperature probe 24 protected against the direct radiation.

For greater clarity, the signal transmission circuits and the control circuits are not shown. The cooling air is evacuated into the free air by pipe 26. In cooling zone A, the cooling of the glass plates generally is less than 50° C., which is sufficient, however, for moving away from critical temperatures that are later able to generate defects.

In the embodiment shown in FIG. 1, sections B, C and D of the second cooling zone are not separated from one another, but constitute a continuous channel through which the cooling air passes in the direction opposite the direction of transport of the glass plates. The cooling air circulated in a closed circuit; the air extracted from section B by blower 30 mounted on pipe 31 is transmitted to sections C and D by pipes 32 and 33 after an optional balancing of its temperature.

The temperature of the cooling air introduced in section C is regulated by a heat exchanger 36, which cools it by the outside air sucked in by a pump 37 whose flow is regulated by a reducing damper 39 arranged in pipe 38. Reducing damper 39 is controlled by an electric motor 40 whose speed is modified as a function of the temperature by a thermocouple 41 placed in pipe 42.

Going from pipe 42, pipe 43 is the one by which the cooling air intended for section C first is sent into a continuous heater 44 comprising heating electric resistors operated only if the air exhibits too low a temperature in pipe 32, which can occur particularly during a starting phase of the furnace. The association of this heating and the heat exchanger makes possible a fine regulation of the temperature of the cooling air. The cooling air introduced into section C typically should exhibit a temperature of about 300° controlled by a thermocouple 45.

The cooling air transmitted to section D by pipes 33 should exhibit a temperature of about 200°. For this purpose, it is cooled by another heat exchanger 48 fed fresh air by pump 49. The flow is regulated by reducing damper 51 controlled by electric motor 50, as a function of the temperature found in pipe 53 by thermocouple 52. Between pipe 53 and pipes 33 again is provided a continuous electric heater 54 by which the cooling air optionally is brought to a higher temperature, starting of heater 54 being controlled by the measurement by thermocouple 55 of the temperature of the air in pipe 33.

On each side of conveyor 2, sections C and D comprise blowing boxes 58 in which pipes 32 and 33 come out and which are provided, on their faces located opposite the glass plates, with slot nozzles placed crosswise, over the entire width of the blowing boxes. Reducing dampers 34 and 35 optionally make it possible to regulate the air flow feeding each chamber 58.

Section B, into which the cooling air is sucked, also is equipped with electric heating devices 60, which make it possible, when required, to raise the temperature of the rollers of the conveyor and of the entire zone. The temperature is measured by thermocouples 61 protected from direct radiation, the corresponding signal being used for quantity regulated for voltage regulator 62.

At the output of the chamber, the temperature of the glass plates is controlled by a pyrometer 63, the temperature of the glasses should be about 200° C.

With a cooling air circulating in a closed circuit, the amount of air introduced in the chamber corresponds by definition to the amount of air sucked in. But it can be useful to modify slightly the ratio between the blown air and the sucked-in air, to produce a slight excess pressure or, on the contrary, a slight partial vacuum in the chamber itself.

Figure 2:
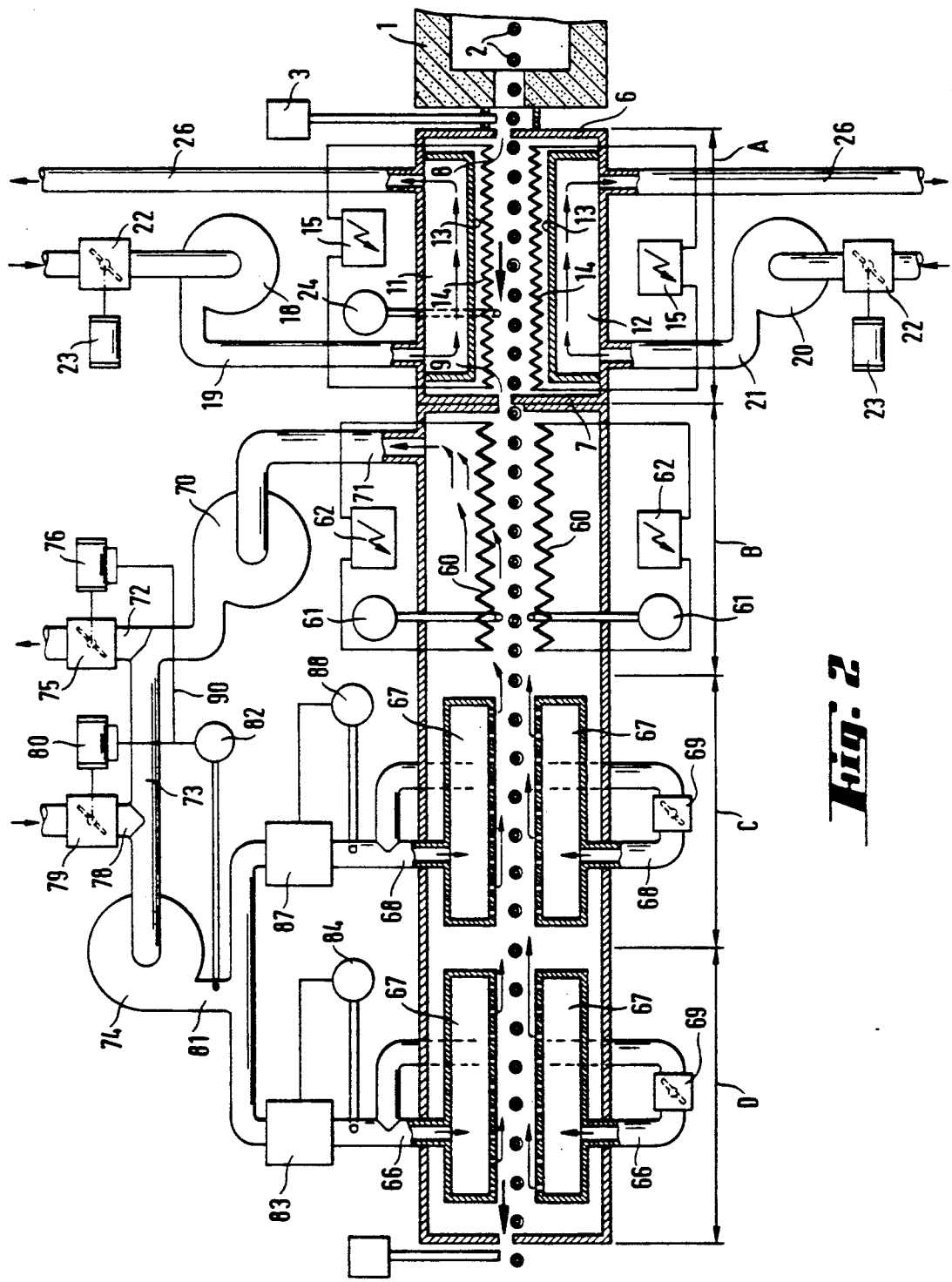
FIG. 2 shows a second embodiment of a heat conditioning chamber according to the invention.

In the embodiment shown in FIG. 2, the chamber also comprises two cooling zones, a first cooling zone A and a second cooling zone of one of three sections B, C and D. As above, cooling zone A is isolated by partition 6 provided with an input slot 8 and partition 7 in which an output slot 9 is provided. Cooling zone A of FIG. 2 is identical to the one shown in FIG. 1.

The air cooling section D is blown by blowing boxes 67 fed by pipes 66 and placed on each side of conveyor 2. Blowing boxes 67 are provided with blowing slots placed crosswise and extending over the entire width of the boxes. Blowing boxes 67 of the same type are placed in section C, where they are fed by pipes 68. Reducing dampers 69 inserted in pipes 66 and 68 make possible the regulation of the cooling air flows. The air blown by blowing boxes 67 circulates in the chamber in the direction opposite the direction of transport of the glass plates as the arrows indicate and is sucked in by blower 70 mounted on pipe 71 coming out in section B.

From blower 70, a part of the sucked-in cooling air is returned to the atmosphere by pipe 72, the other part again leaves in the circuit by pipe 73 and arrives first in blower 74. A reducing damper 75 actuated by a motor 76 is used to modify the ratios of the flows in pipes 72 and 73.

Before being sucked in by a blower 74, the hot air arriving by pipe 73 is mixed with the cold air arriving by a pipe 78, the proportion of cold air being regulated by reducing damper 79 actuated by motor 80. The proportion of cold air determines the temperature of the air in pipe 81, reducing damper of cold air 79 being more or less open as a function of the temperature measured in pipe 81 by thermocouple 82. A fine regulation of the temperature of the cold air entering sections C and D is obtained by heating elements 83 and 87 controlled as a function of the temperatures measured in pipes 66 and 68 by thermocouples 84 and 88.

Reducing dampers 79 and 75 are coupled by control circuit 90, the corresponding sucked-in cold air flow either in the flow of the hot air transmitted into the atmosphere or, if required, being slightly different to create a slight excess pressure or partial vacuum in the chamber by raising or lowering the amount of sucked-in cold air relative to the amount of hot air returned to the atmosphere.

Section B is equipped with means for regulating the temperature such as electric heating devices 60 placed above and below conveyer 2. The temperature is controlled by thermocouple 61 placed between conveyor 2 and heating devices 60.

Figure 3:
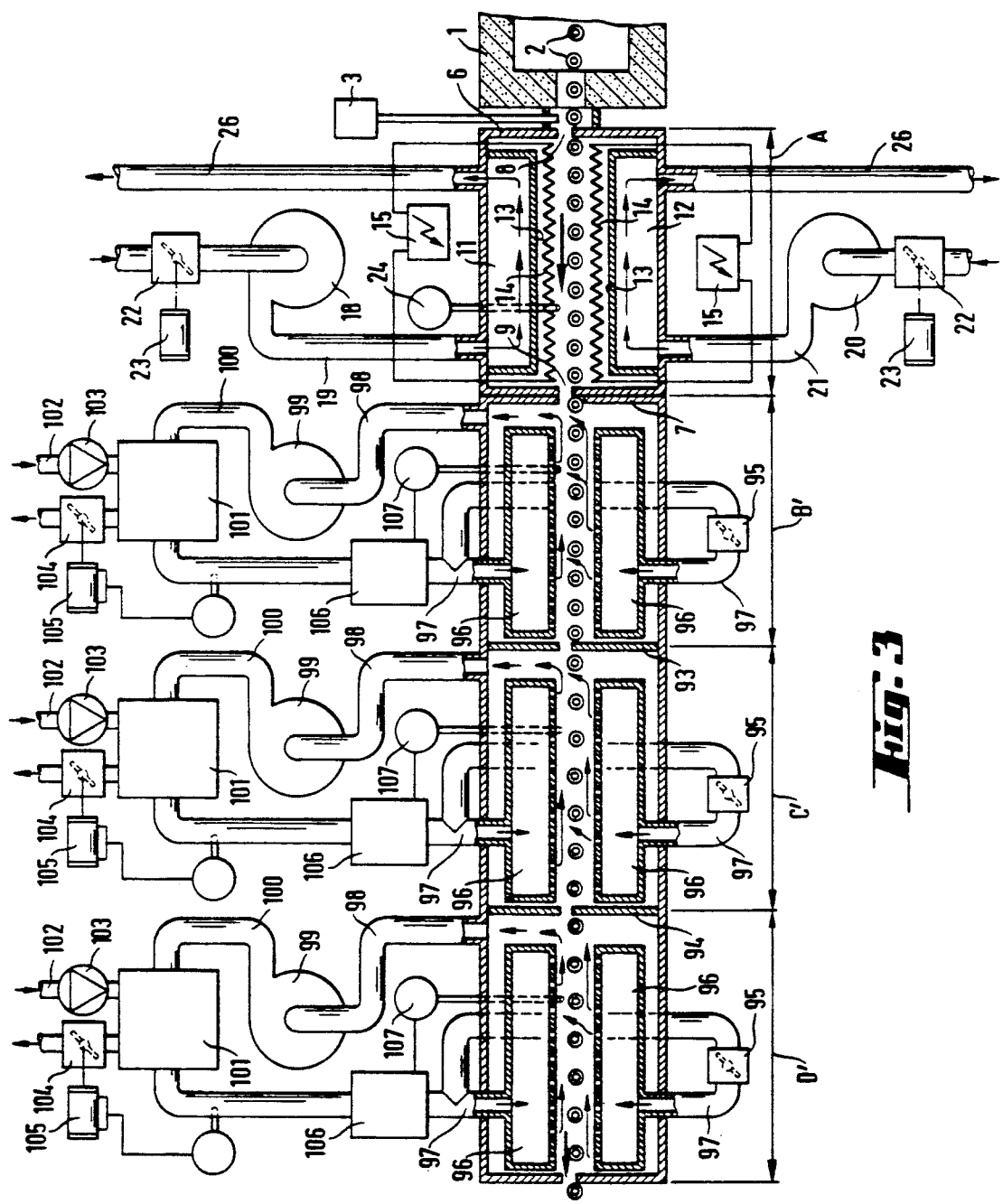
FIG. 3 shows a third embodiment of a heat conditioning chamber according to the invention.

In the third embodiment shown in FIG. 3, the chamber comprises a first cooling zone A and a second cooling zone comprising three sections B', C' and D'. Cooling zone A is identical to cooling zone A described with FIG. 1.

Sections B', C' and D' are isolated from one another by partitions and each section has its own closed circuit for cooling air. A partition 93 between sections B' and C' prevents the passage of the air from section C' to section B', and partition 94 protects section D' from section C'.

In each of the three sections B', C' and D', a cooling air current circulating substantially in the longitudinal direction, in the direction opposite the direction of transport of the glass plates, a blower and a regulation system for the flow and the temperature of the cooling air being allotted to each of the three sections, are maintained. The devices for production and regulation of the cooling air current are identical for the three sections and will be described simply for section B'.

Blowing boxes 96, provided with blowing slots arranged perpendicular to the direction of transport of the glass plates, are placed above and below the conveyor.

Blowing boxes 96 are fed by pipes 97 whose flow is regulated, if necessary, by reducing dampers 95, whereas the heated cooling air is sucked in by pipe 98. By a pipe 100, blower 99 sends the heated cooling air to heat exchanger 101. In this heat exchanger 101, the air is cooled to the desired temperature by the cold air sucked in from the outside by pipe 102 by pump 103, the flow of cold air being controlled by reducing damper 104 by electric motor 105. The precision adjustment of the temperature of the cooling air brought into blowing boxes 96 is performed by continuous electric heater 106 controlled as a function of the temperature measured by thermocouple 107 protected from direct radiation.

The three sections B', C' and D' of the second cooling zone being adjustable separately, the temperature inside each section can be regulated in an optimal manner to the most favorable value, independently of the temperature prevailing in the adjacent sections.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A heat conditioning apparatus for controlled cooling following a high-temperature treatment of plane thin glass sheets, comprising:
   a heat conditioning chamber;
   a continuously driven roller conveyor extending through said heat conditioning chamber for transporting said glass sheets in a horizontal position from a furnace through said heat conditioning chamber;
   at least two independent cooling zones defined in said heat conditioning chamber and arranged along a direction of movement of said glass sheets on said conveyor;
   partitions for longitudinally limiting a first cooling zone of said at least two independent cooling zones, said partitions defining narrow input/output slots for the glass sheets;
   a radiation absorber disposed on each side of said conveyor located in said first cooling zone, said radiation absorbers extending over the entire width of said first cooling zone, said radiation absorber comprising means for permitting the passage of cooling air therethrough, means for adjusting the cooling air flow which passes through said radiation absorbers in said first cooling zone, and means for adjusting the temperature of the cooling air passing through the radiation absorbers; and
   slot nozzles positioned on each side of said conveyor and defining at least one cooling section in a second cooling zone of said at least two independent cooling zones, said slot nozzles being positioned perpendicular to the direction of movement of said glass sheets on said conveyor, said slot nozzles blowing cooling air which is regulated in temperature and comprising openings which provide the cooling air with a component of axial speed in a direction opposite to the direction of movement of said glass sheets.

2. Heat conditioning apparatus according to claim 1, wherein each of said radiation absorbers comprise a plane metal absorption plate.

3. Heat conditioning apparatus according to claim 2, wherein electric heating elements are provided in said first cooling zone between the conveyor and the absorption plates.

4. Heat conditioning apparatus according to claim 3, comprising:
   a circuit for regulating the temperature of the first cooling zone operating as a function of the temperature measured by a probe which is positioned between the conveyor and one of said radiation absorbers and protected from direct radiation.

5. Heat conditioning apparatus according to claim 4, wherein said means for adjusting the cooling air flow passing through said radiation absorber comprises blowers which are joined to each of said radiation absorbers.

6. Heat conditioning apparatus according to claim 5, wherein said second cooling zone includes at least two of said cooling sections arranged along the direction of movement of said glass sheets comprising said slot nozzles for blowing cooling air and means for separately adjusting the temperature of the cooling air supplied to said slot nozzles, wherein said cooling air longitudinally passes through said second cooling zone of said heat conditioning chamber.

7. Heat conditioning apparatus according to claim 6, wherein the second cooling zone includes a third section positioned adjacent to said first cooling zone and comprises pipe means for sucking in said cooling air which passes through said second cooling zone of said heat conditioning chamber.

8. Heat conditioning apparatus according to claim 7, wherein said slot nozzles, said pipe means and said means for separately adjusting the temperature of the cooling air define a closed circuit in which said cooling air circulates, said means for separately adjusting the temperature comprising heat exchangers for cooling said circulating air to a desired temperature, said heat exchangers being externally disposed with respect to said heat conditioning chamber.

9. Heat conditioning apparatus according to claim 7, wherein said slot nozzles, said pipe means and said means for separately adjusting the temperature of the cooling air define a means for partially circulating the cooling air in a closed circuit and, said means for separately adjusting the temperature of the cooling air comprise means for admitting cold air for mixing with the partially circulating air.

10. Heat conditioning apparatus according to claim 8 or 9, wherein said closed circuit comprises heating means for regulating the temperature of the circulating or partially circulating air.

11. Heat conditioning apparatus according to claim 10, comprising means for measuring the temperature of the air before its passage through said slot nozzles and controlling said heating means as a function of said measured temperature.

12. Heat conditioning apparatus according to claim 11, wherein said at least two sections of the second cooling zone comprising said slot nozzles include blowing boxes, said slot nozzles being positioned on said blowing boxes.

13. Heat conditioning apparatus according to claim 12, wherein electric hearing devices are positioned in said third section of said second cooling zone which is positioned adjacent to said first cooling zone.

14. Heating conditioning apparatus according to claim 6, wherein said chamber comprises partitions for separating the sections of the second cooling zone.

15. Heat conditioning apparatus according to claim 14, wherein said second cooling zone includes at least three of said cooling sections, each of said three cooling sections including blowing boxes, said slot nozzles being positioned on said blowing boxes.

16. Heat conditioning apparatus according to claim 15, wherein each of said three sections comprise means defining a closed circuit for withdrawing and circulating the air provided with heat exchangers and heating means for providing a fine adjustment of the temperature of the cooling air.

* * * * *